Dec. 1, 1931.  M. F. MACDONALD  1,834,218
PHOTOGRAPHIC PRINTING MACHINE
Filed July 9, 1928  3 Sheets-Sheet 1
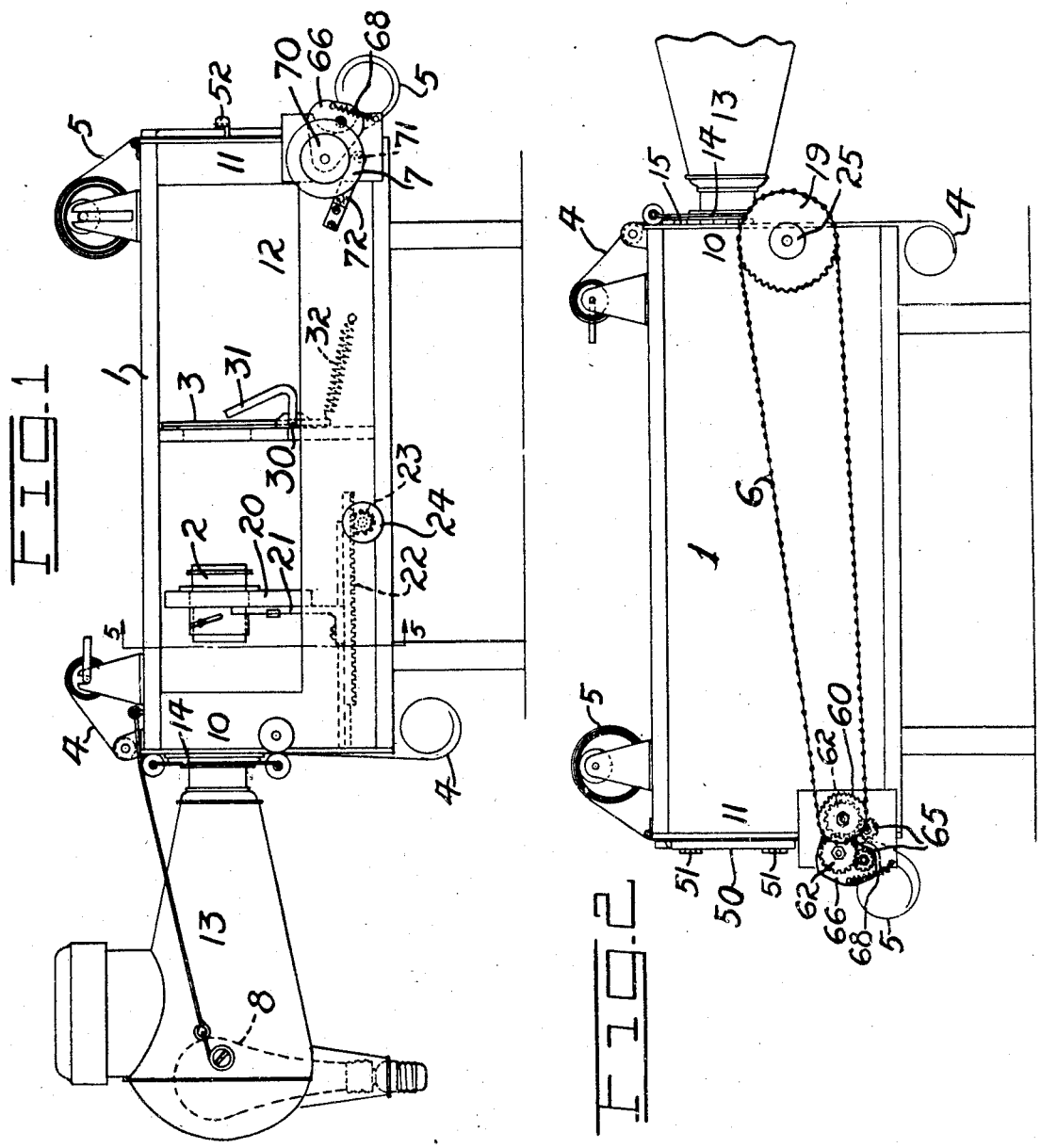
Inventor
Maynard F. Macdonald
By Reynolds&Reynolds,
Attorneys

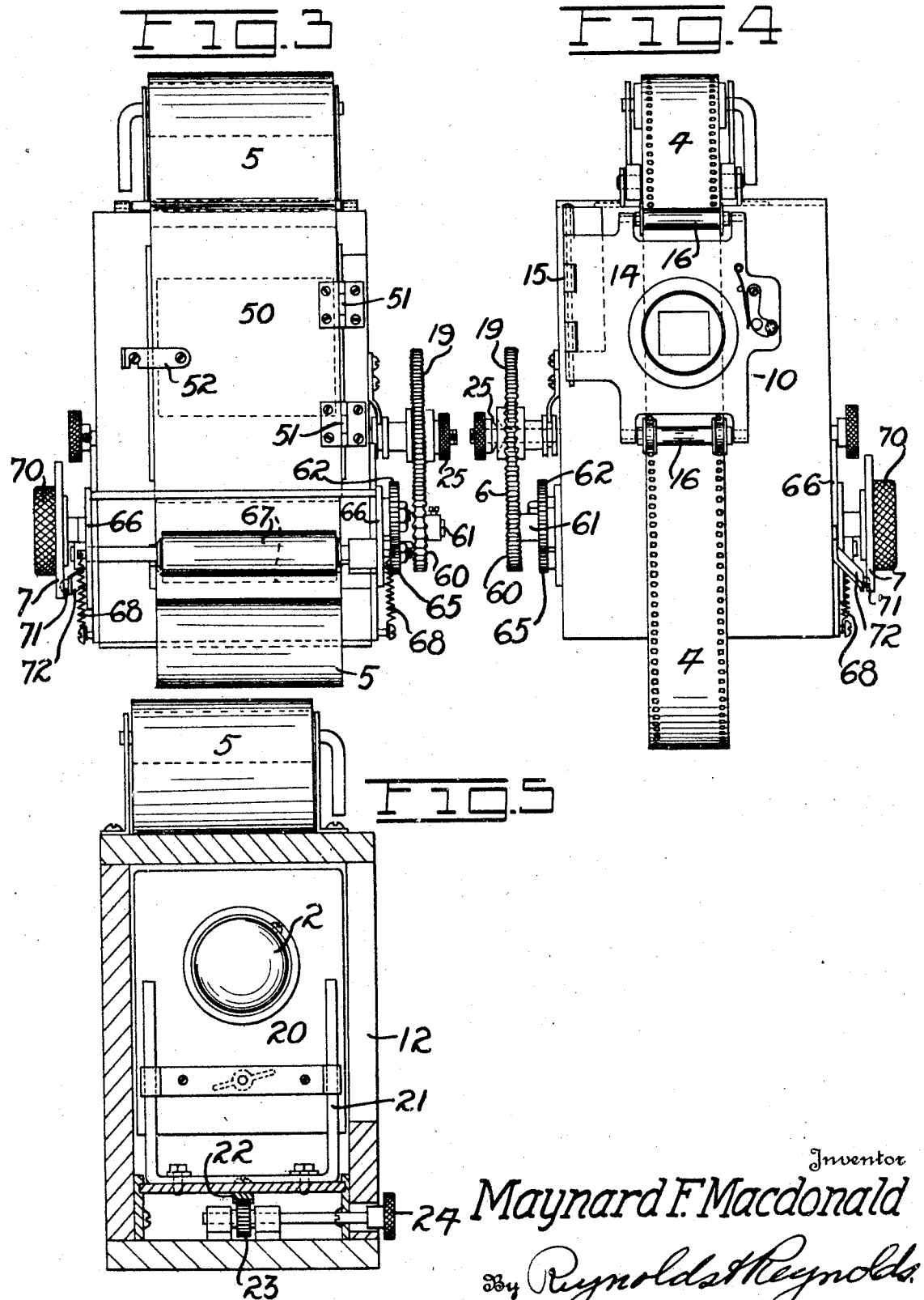

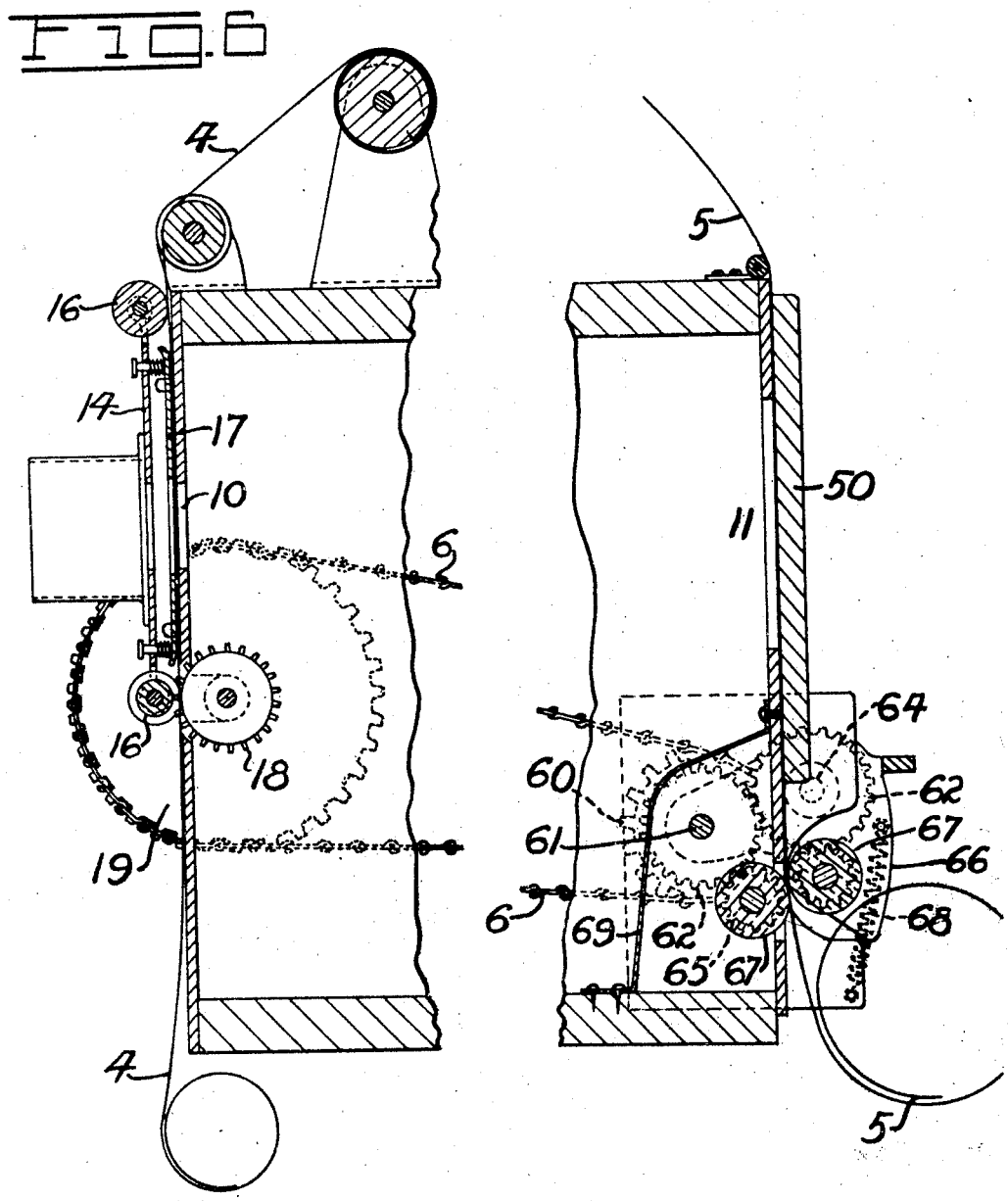

Patented Dec. 1, 1931

1,834,218

UNITED STATES PATENT OFFICE

MAYNARD F. MACDONALD, OF VICTORIA, BRITISH COLUMBIA, CANADA, ASSIGNOR OF TWO-FIFTHS TO FRANCIS J. H. BAINES, OF VICTORIA, CANADA

PHOTOGRAPHIC PRINTING MACHINE

Application filed July 9, 1928. Serial No. 291,262.

My invention relates to photographic printing machines, and particularly to machines designed for producing a strip of enlarged prints from a strip of small negatives.

The object of my invention is to provide a practical means whereby a film strip, such as are produced by the type of movie camera which uses a film strip of limited length, may be used to produce enlarged prints, arranged if desired as a picture strip, and also whereby any exposure of the negative strip may be omitted and substitutions from other negative strips may be interpolated.

My invention consists of an enlarging camera provided with features of construction whereby the above results may be secured.

In the accompanying drawings I have illustrated my invention as embodied in a camera of a specific construction which has been employed by me and one which illustrates the principles of my invention.

Figure 1 is a side elevation with a panel of the casing removed to show the interior construction.

Figure 2 is an elevation of the side opposite to that shown in Figure 1.

Figure 3 is an elevation of the picture printing end and Figure 4 of the light receiving end.

Figure 5 is a transverse section on the plane indicated by the broken line 5—5 of Figure 1.

Figure 6 is a longitudinal section through the opposite ends of the machine.

One of the practical objections against the use of motion picture cameras by the amateur or the public at large, is that the pictures taken are too small to give any satisfaction unless shown with a projecting camera. It is the object of my present invention to provide a means whereby enlarged prints may be made from such a film as conveniently as from any other type of negative and as cheaply as prints of the same size may be made from other types of negatives.

To do this I employ what is in effect an enlarging camera, the negative film strip being fed across a light receiving hole at one end and the sensitive picture strip being exposed by a corresponding step-by-step movement at the other end. The camera illustrated is mounted in a box 1 of rectangular outlines having a light receiving opening before which the negative film is exposed at the end 10 and a printing opening at the end 11, before which the sensitive picture strip is fed by a step-by-step movement. At one side the box 1 has a removable panel which closes a hole 12, through which access may be had to the interior.

A lens 2 is mounted in a frame 20 which is vertically adjustable on a guide frame or standards 21 and this is mounted for movement lengthwise of the box 1, being movable through rack 22 and pinion 23, the latter being turned by a knob 24 located outside of the box. The lens is thus adjustable for focus and to vary the size of picture produced.

Intermediate the ends of box 1 is a shutter 3, pivoted at 30 and operated by an outside handle or crank arm 31. Spring 32 automatically returns the shutter to normal position. Any type of shutter found satisfactory may be used.

The printing light 8 is contained in a casing 13, which has been mounted upon a plate 14, pivoted at 15 and serving as a gate or guide for the negative film 4. This is supposed to be in the form of a roll mounted on top of the box 1 and passing under gate 14 being held in place by guide rollers 16 and a spring held guide plate 17. The film is usually provided with holes along its edge, which are engaged by the teeth of a feed wheel 18, to thereby secure accurate feeding. The shaft of feed wheel 18 extends outside of the box and is provided with means by which is may be turned. As illustrated, this is turned through a wheel 19 and a chain 6 which passes over a gear 60 connected with the feed mechanism of the sensitized picture strip 5. To permit independent feeding of the film or negative strip and the picture strip, I have provided means whereby the gear 19 may be fixed upon or freed from its shaft. This may be a friction or other form of clutch, as its illustrated at 25, which shows a knob threaded upon the shaft and having a coned end engaging a like surface upon wheel 19.

The wheel 60 is fixed to shaft 61. This shaft and the adjacent parallel shaft 64 have intermeshing gears 62 fixed thereon and each mesh with and drive a gear 65 mounted upon other adjacent shafts, upon which shafts are feed rollers 67, between which passes the picture strip 5. The outer feed roller 67 is journaled in plates 66 which pivot about the axis of shaft 64. A spring 68 holds the feed rollers normally in contact. The outer roller may be readily moved outward enough to facilitate insertion of the picture strip 5. The feed rollers are also made removable, so that rollers of a different size may be substituted to thereby vary the rate of feed of the picture strip relative to the negative strip 4, to thereby vary the size of picture produced.

A gate 50, hinged at 51 and secured by a latch 52 will swing to permit insertion of the strip 5, and holds the strip in proper printing position.

Shaft 61 has secured thereto outside of the box, a disk 7 and a knob 70 or other suitable means whereby it may be turned. The disk 7 is provided with some form of catch, or ratchet device which will yieldingly hold it against movement, or indicate clearly the correspondence of its position with the proper printing position of the negative film 4. As illustrated this consists of a hole or holes in disk 7 into which drops a pin or projection 71 of rounded contour carried by spring arm 72. This insures that the negative film has its individual pictures properly positioned before the light aperture at 10. The picture strip feeding mechanism is preferably partitioned off from the remainder of the camera box by a plate 69.

In operation the film or negative strip 4 is placed in position in its guiding and feeding device and the sensitive or picture strip 5 in its feeding and guiding device. With these properly positioned the shutter is swung down or otherwise operated, thus making one exposure. By turning the strip feeding mechanism one unit amount, the next picture on the negative strip is brought into printing position, as is also the next space of the picture strip, whereupon the shutter is operated to make another exposure. This may be continued until one or the other strip has been used up.

If it is desired to omit any picture upon the negative strip 4, or to make more than one exposure from the same negative, this may be done by freeing the feed rollers of the negative strip by release of the clutch device 25. By substituting other negative film it is possible to make on one picture strip pictures from two or more negative film strips.

With this device printing from negative strips may be done rapidly and variation of order of the prints produced may be made at will.

What I claim as my invention is:

1. In a photographic printing machine employing a sensitized picture strip, a strip feeding mechanism comprising two intermeshing driving gears, two feed rollers adapted to engage opposite sides of the strip, a gear on each roller engaging each with its respective one of the driving gears, a frame in which one feed roller is journaled, said frame being pivoted upon the axis of its connected driving gear, and means for substituting the feed rollers to thereby vary the strip feed by varying the size of the feed rollers.

2. In a photographic printing machine for printing upon a sensitized picture strip, strip feeding mechanism comprising two intermeshing driving gears, means associated with one of said gears to stop it following a predetermined angular advance, pairs of rollers of varying diameters interchangeably adapted to engage opposite sides of the strip, a gear on each roller of a pair engaging each with its respective one of the driving gears, and supporting means for the feed rollers permitting substitution of different sized pairs, thereby to vary the amount of the strip feed.

3. In a photographic printing machine for printing upon a sensitized strip, strip feeding mechanism comprising two intermeshing driving gears, pairs of rollers of varying diameters interchangeably adapted to engage opposite sides of the strip, a gear on each roller of a pair engaging each with its respective one of the driving gears, and supporting means for the feed rollers permitting substitution of different sized pairs, thereby to vary the amount of the strip fed.

4. In a photographic printing machine for printing upon a sensitized strip, strip feeding mechanism comprising two intermeshing driving gears, pairs of rollers of varying diameters interchangeably adapted to engage opposite sides of the strip, a gear on each roller of a pair engaging each with its respective one of the driving gears, and supporting means for the feed rollers permitting substitution of different sized pairs, thereby to vary the amount of the strip fed, said supporting means including a frame upon which one roller of the operative pair is mounted, said frame being pivoted upon the axis of its connected driving gears, and yieldable means urging said rollers together.

5. In a photographic printing machine for printing upon a sensitized strip from a strip negative, a negative strip holder and feeder, a sensitized strip holder and feeder, a shutter interposed therebetween, the strip feeder including a driving gear and a plurality of interchangeable pairs of strip-engaging feed rollers of different sizes, the operative pair being connected for operation to said driving gear, a synchronizing drive connection between the negative strip feeder and said gear, and means associated with said gear to stop it following a predetermined angular advance.

Signed at Victoria, B. C., this 23rd day of June, 1928.

MAYNARD F. MACDONALD.